United States Patent [19]

Dively

[11] 4,053,244
[45] Oct. 11, 1977

[54] COMPRESSION COUPLING MEANS FOR A RAISE BORING HEAD

[75] Inventor: Charles R. Dively, Seattle, Wash.

[73] Assignee: Ingersoll-Rand Company, Woodcliff Lake, N.J.

[21] Appl. No.: 619,658

[22] Filed: Oct. 6, 1975

[51] Int. Cl.$^2$ .................. F16B 2/14; F16D 1/08
[52] U.S. Cl. ........................ 403/13; 403/16; 403/369; 403/370
[58] Field of Search ............. 403/368, 369, 370, 371, 403/13, 14, 16, 23

[56] References Cited

U.S. PATENT DOCUMENTS

| 1,378,091 | 5/1921 | Carlsen | 403/308 |
| 1,472,565 | 10/1923 | Manning | 403/370 X |
| 2,407,032 | 9/1946 | Myers | 403/247 |
| 2,634,144 | 4/1953 | Friedman | 403/370 X |
| 2,810,587 | 10/1957 | Boughner | 403/371 X |
| 3,257,070 | 6/1966 | Kuklinski | 403/370 |
| 3,400,905 | 9/1968 | VanDusen | 403/369 X |

FOREIGN PATENT DOCUMENTS

| 1,399,694 | 5/1965 | France | 403/370 |
| 136,976 | 8/1952 | Sweden | 403/370 |
| 706,999 | 4/1954 | United Kingdom | 403/370 |

Primary Examiner—Andrew V. Kundrat
Attorney, Agent, or Firm—Bernard J. Murphy

[57] ABSTRACT

In the embodiment shown, the coupling means comprises an annular wedge which is insertable between the stem and the cutterhead of a raise borer, the wedge being bolted to the cutterhead to effect contact pressure in order that rotary torque will be transmitted from the stem to the cutterhead. A thrust plate is secured to the lower end of the stem in engagement with a lowermost surface of the cutterhead. In addition, a friction locking assembly is used on an underlying or protected portion of the cutterhead to center and locate the stem relative thereto.

8 Claims, 4 Drawing Figures

COMPRESSION COUPLING MEANS FOR A RAISE BORING HEAD

This invention pertains to raise boring heads and in particular to means for selectively replacing the stem in a raise boring head; such means comprising a compression coupling.

Raise boring heads are used to enlarge connecting pilot bores formed between underground tunnels, or between an earth surface and an underlying tunnel, and commonly it is difficult, because of space limitations, to accommodate an entire raise borer reaming head within a tunnel. That is, it is far simpler to be able to transport the cutterhead, alone, along the tunnel, and meet the stem for the cutterhead, for intercoupling of the two, as the stem is passed through the pilot bore. For this reason, at least, there has been a long-felt need for raise boring heads which have removable or replaceable stems and, therefore, efficient stem-coupling means are in demand. Additionally, coupling means for raise boring head stems can simplify and otherwise enhance tunnelling operations as, thereby, a fractured or otherwise worn stem can be replaced in position without the entire cutterhead having to be removed.

It is, therefore, an object of this invention to set forth a coupling means for replaceably coupling stems to raise borer cutterheads. Especially is it an object of this invention to set forth a compression coupling means for replaceably coupling a raise borer drive stem to a raise borer cutterhead, comprising a plurality of first means for mutually and interpositionally engaging both a cutterhead element and a drive stem element therefor, for effecting locking or clamping contact pressure therebetween at a plurality of locations spaced apart lengthwise of a drive stem element; and second means for replaceably fastening one of said first means to at least one of said elements.

Further objects of this invention, as well as the novel features thereof, will become more apparent by reference to the following description taken in conjunction with the accompanying figures, in which.

Figure 1:
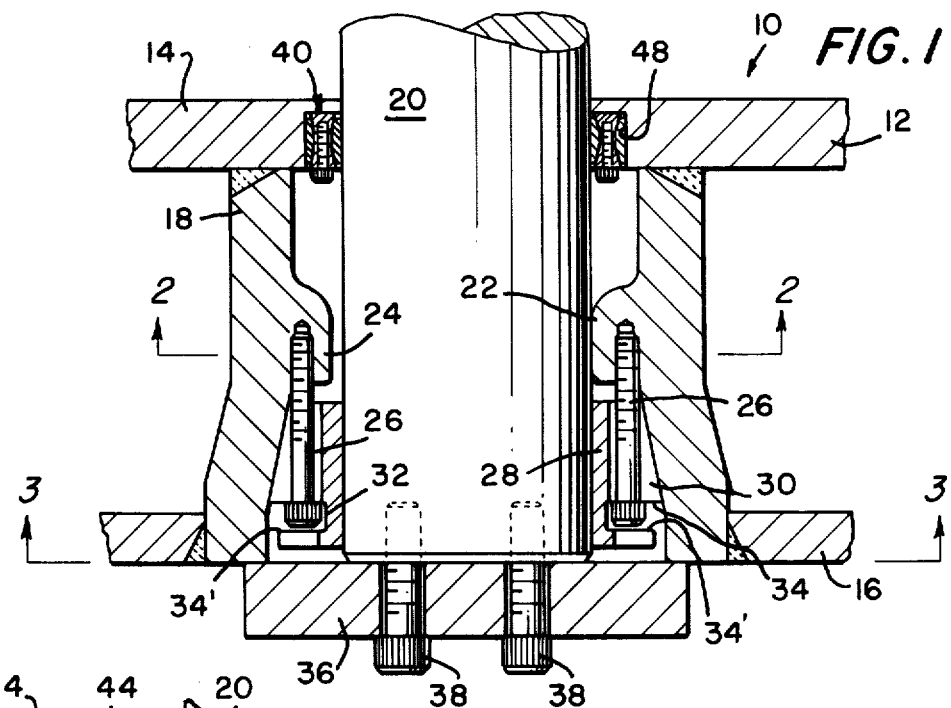
FIG. 1 is a cross-sectional view, in elevation, showing a portion of a raise borer cutterhead, and the terminal end of a stem which is replaceably coupled to the cutterhead by means of an embodiment comprised by the invention.
Figure 4:
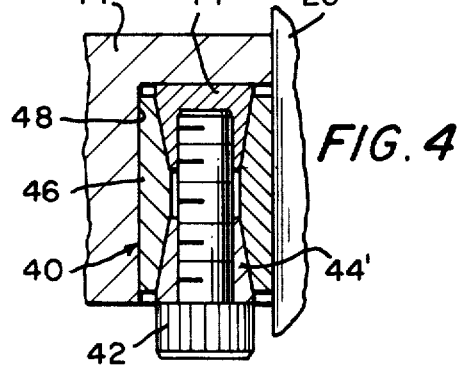
FIG. 4 is an enlarged detail, taken from FIG. 1, showing the nesting of a friction locking assembly in the underside of the cutterhead upper plate.
Figure 2:
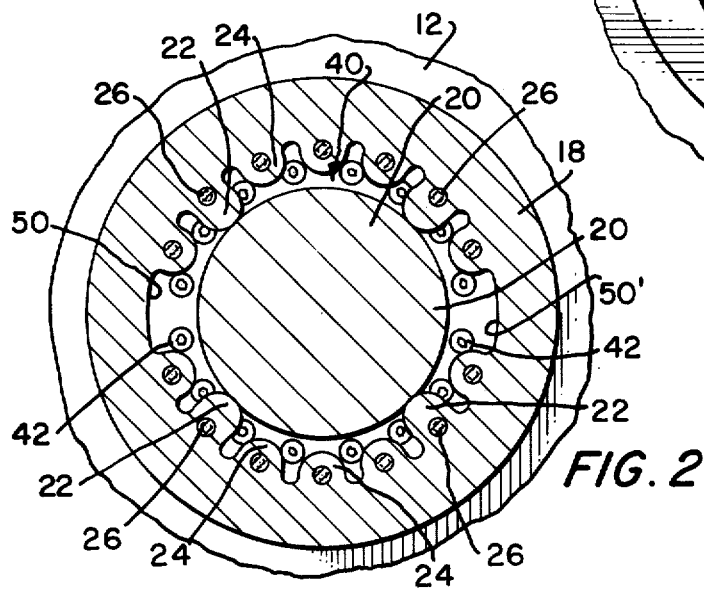
FIG. 2 is a cross-sectional view generally taken along section 2—2 of FIG. 1.

As shown in the Figures, a portion of a raise boring head 10 is depicted which comprises a cutterhead 12 defined by a pair of plates 14 and 16 which are spaced apart by an annular weldment 18. A cutterhead stem 20 has a terminal end which is received centrally by both plates, and is enveloped by the annular weldment. The weldment 18, as FIGS. 1 and 2 show, has a series of lobes or bosses 22 and 24 formed on the inner surface thereof which are tapped to receive machine screws or bolts 26.

An annular wedge 28, formed of a series of quadrants 28' is received within the weldment 18 and, in turn, accommodates the bolts 26. Bolts 26 are the means by which the wedge quadrants 28' are forced in between the lowermost portion of the stem 20 and the weldment 18. Each quadrant, of course, defines an arcuate portion of the annular wedge 28, and has on the outer, convex surface thereof equally-spaced-apart grooves 30 in which are recieved the shanks of the bolts 26. The grooves are all interrupted, across and adjacent one end thereof, by a trough 32 which lies normal to the axis of the grooves; the trough 32 is provided to retain the drive heads of the bolts.

Figure 3:
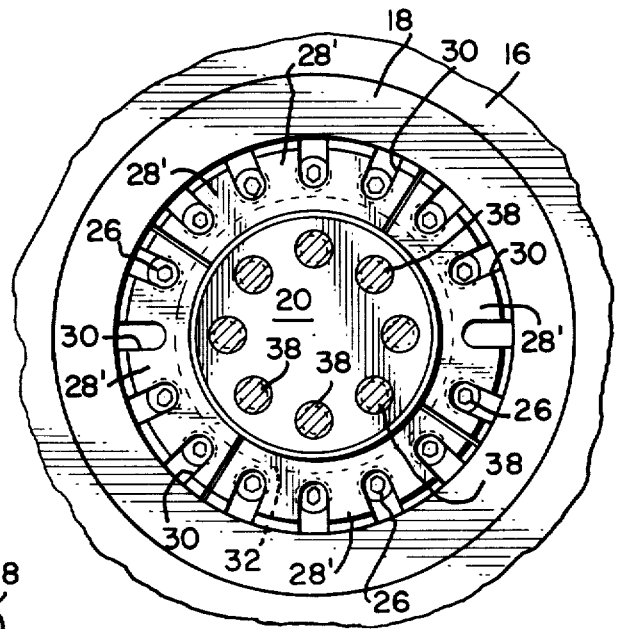
FIG. 3 is a cross-sectional view generally taken along section 3—3 of FIG. 1.

With the wedge quadrants 28' being set in place, and the drive heads of the bolts 26 being nested in the trough 32, application of a driver tool to each of the bolts (to fasten the latter in the bosses 22 and 24) will cause the underneath side of the drive heads to engage one side or wall 34 of the trough. This forces the quadrants 28' into a compressive and interference engagement with both the stem 20 and the annular weldment 18. When it becomes necessary to remove the stem, the opposite side or wall 34' of the trough 32 interferes with the unthreading of the bolts. The terminal drive ends of the bolt heads engage this other wall 34' of the trough and forces the wedges to come free from the stem. The grooves 30 have a given maximum width and, as FIG. 3 evidences, the heads of the bolts 26 have a diameter greater than the maximum groove width.

The wedge quadrants 28', as noted, cooperate to transmit rotary torque from the stem 20 to the cutterhead 12. Thrust, however, is reacted through a thrust plate 36. Plate 36 is fixed to the lower end of the stem 20 by means of bolts 38 shown in FIG. 1, and the plate also engages a lowermost surface of the cutterhead 12.

A friction locking assembly 40, of a type well known in this art, and sold under the trademark "Ringfeder," is used to centralize the stem 20 within the cutterhead 12, and frictionally to fasten the stem 20 in the cutterhead. In the prior art such friction locking assemblies are normally received in the top of the cutterhead (i.e., within the uppermost surface of plate 14) where, unavoidably, it must interfere with mounting saddles for the rotary cutters and, also, is exposed to damage and the collection of debris. It is my teaching to dispose the friction locking assembly 40 in the underneath side of the top plate 14 of the cutterhead 12 so that it will neither interfere with mountings for the rotary cutters, nor will it be exposed to damage or debris.

To replace stem 20, bolts 38 are removed and thrust plate 36 is withdrawn. Next, the bolts 26 are unthreaded from bosses 22 and 24 to force the quadrants 28' from the annular weldment 18. With the quadrants 28' removed, the cap screws 42 of the friction locking assembly 40 next are loosened, and the stem 20 can be withdrawn from the cutterhead 12.

On any occasion when the stem 20 is removed, the friction locking assembly 40 should be inspected for damage: fracture, wear, etc. If assembly 40 must be replaced, it is done as follows. The cap screws 42 are further loosened to displace the thrust rings 44 and 44' from each other, and to free the clamping outer ring 46 from the annular recess 48. Then, the assembly 40 is turned endwise until it is aligned with the axial center of the weldment 18, whereupon it is withdrawn, thus — endwise, through the generally U-shaped channels 50 and 50' provided therefor in weldment 18.

It will be noted that four lobes 22, equally spaced apart, project inwardly of weldment 18 sufficiently to engage the stem 20. This provisioning offers alignment and stability to the stem, weldment, etc., during assembly and disassembly of the pertinent removable components, failing which there would be some considerable nutation and/or canting of components. Alignment, of course, must be correct and, in fact, it is essential that the axial termination of the stem lies in the same plane as the exposed, bottom surface of cutterhead 12. Further, it will be noted, lobes 22 and 24 define narrow slots therebetween; these slots provide access to the cap screws 42 of assembly 40 (that the screws can be torqued and loosened).

As pointed out before, plate 36 is provided to react thrust (in cooperation with weldment 18, plate 16, etc.). Additionally, however, it serves to protect the stem coupling components from damage and debris; plate 36 cooperates with weldment 18 to define a sort of enclosure for the wedge quadrants 28′, the friction locking assembly 40, and for their associated hardware.

While I have described my invention in connection with a specific embodiment thereof it is to be clearly understood that this is done only by way of example and not as a limitation to the scope of the invention as set forth in the objects thereof and in the appended claims.

I claim:

1. Compression coupling means for replaceably coupling a raise borer drive stem to a raise borer cutterhead, comprising:
 a plurality of first means for mutually and interpositionally engaging both a cutterhead element, and a drive stem element therefor, for effecting locking or clamping contact pressure therebetween at a plurality of locations spaced-apart lengthwise of a drive stem element; and
 second means for replaceably fastening one of said first means to at least one of said elements; wherein
 said one first means comprises a plurality of wedge sectors for effecting an interference fit between a cutterhead element and a drive stem element therefor; and
 said sectors are cooperative together to define a complete annulus for enveloping a portion of a drive stem element;
 each of said sectors defines a quadrant of said annulus;
 said sectors each having a first arcuate inner surface and a second arcuate outer surface for engaging a drive stem and a cutterhead, respectively;
 one of said inner and outer surfaces has a plurality of grooves formed therein to receive fasteners; and
 each of said grooves is interrupted by a channel formed in said one surface transverse of said grooves.

2. Coupling means, according to claim 1, wherein:
 opposite walls of each of said groove-transversing channels define bearing surfaces, one of said bearing surface walls being engageable by heads of groove-received fasteners for wedgingly forcing said sectors between a cutterhead and a drive stem, and the opposite bearing surface wall is also engageable by heads of groove-received fasteners for dislodging said sectors from between a cutterhead and a drive stem.

3. Coupling means, according to claim 2, in combination with a raise borer cutterhead and a raise borer stem, wherein:

said second means comprises threaded fasteners having drive heads;
 said cutterhead has tapped holes formed therein to receive said fasteners;
 said fasteners are threadedly engaged with said tapped holes; and
 said drive heads are nested in said channels.

4. The combination, according to claim 3, wherein:
 said grooves have a given maximum width; and
 said drive heads have a diameter greater than said given maximum width.

5. The combination, according to claim 3, further including:
 a thrust plate replaceably fastened to said stem and in contacting engagement with said cutterhead.

6. The combination, according to claim 3, wherein:
 said cutterhead has an annular weldment in envelopment of a portion of said stem;
 said weldment has a plurality of bosses formed therein; and
 said tapped holes are formed in said bosses.

7. The combination, according to claim 3, wherein:
 said cutterhead comprises at least one plate having an aperture formed therein, said plate having an upper surface, relative to normal, upward raise-boring directional movement of said cutterhead, and an underlying surface;
 said stem is in penetration of said aperture;
 said underlying surface of said plate has an annular recess formed therein in immediate adjacency to said aperture; and
 another of said first means, of said plurality thereof, is replaceably disposed in said annular recess.

8. Wedge means for mutually and interpositionally engaging both a raise borer drive stem element and a raise borer cutterhead element, for effecting locking or clamping contact pressure therebetween, comprising:
 a wedge;
 said wedge defining an annulus having a first inner surface and a second outer surface for engaging a drive stem element and a cutterhead element, respectively; wherein
 one of said surfaces has a plurality of recesses formed therein in which to receive fasteners, in order to fasten said wedge to at least one of said elements;
 said recesses are formed as elongate grooves;
 each of said grooves is interrupted by a channel formed in said one surface transverse of said grooves;
 said channel is formed fully circmferentially in said second, outer surface of said wedge;
 said channel defines of said wedge a wedging portion to one side of said channel and an annular flange portion to the other side thereof;
 said wedging and flange portions have given radii; and
 said flange porton has a maximum radius which is less than a maximum radius of said wedging portion, whereby said flange portion is maintained in a spaced-apart relationship from a most adjacent or most proximate surface of a cutterhead upon the latter and said wedge being wedgingly forced into mutual engagement.

* * * * *